(12) United States Patent
Blohm et al.

(10) Patent No.: US 7,991,141 B2
(45) Date of Patent: Aug. 2, 2011

(54) METHOD AND APPARATUS FOR PERSONAL CALL ROUTING REQUEST AND HANDLING

(75) Inventors: Jeffrey Mark Blohm, Menlo Park, CA (US); Mark Bernard Hettish, Allen, TX (US); Andrew Mason, Sunnyvale, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1260 days.

(21) Appl. No.: 11/238,588

(22) Filed: Sep. 28, 2005

(65) Prior Publication Data

US 2007/0081658 A1    Apr. 12, 2007

(51) Int. Cl.
*H04M 7/00* (2006.01)
(52) U.S. Cl. .................... 379/219; 379/220.01
(58) Field of Classification Search .......... 379/219, 379/220.01, 221.01, 211.01, 211.02, 211.03, 379/211.04, 230
See application file for complete search history.

(56) References Cited

U.S. PATENT DOCUMENTS

| | | | | |
|---|---|---|---|---|
| 6,161,008 A | * | 12/2000 | Lee et al. | 455/415 |
| 6,381,323 B1 | * | 4/2002 | Schwab et al. | 379/211.02 |
| 6,470,010 B1 | * | 10/2002 | Szviatovszki et al. | 370/356 |
| 7,154,901 B2 | * | 12/2006 | Chava et al. | 370/401 |
| 2005/0215250 A1 | * | 9/2005 | Chava et al. | 455/433 |

FOREIGN PATENT DOCUMENTS

| | | |
|---|---|---|
| EP | 0964553 A1 | 12/1999 |
| WO | 96/38018 A1 | 11/1996 |
| WO | 01/22670 A1 | 3/2001 |
| WO | 2005/004452 A1 | 1/2005 |

OTHER PUBLICATIONS

Lakshmi-Ratan R A: "The Lucent Technologies Softswitch—Realizing the Promise of Convergence," Bell Labs Technical Journal, Wiley, CA, US, vol. 4 No. 2, Apr. 1999, pp. 174-195, XP000851517, ISSN: 1089-7089.

* cited by examiner

*Primary Examiner* — William J Deane

(57) ABSTRACT

A system includes a server including one or more databases for storing one or more handling rules specifying handling of incoming telephone calls; an intermediary routing control unit configured to access the one or more databases responsive to an incoming telephone call and provide the one or more handling rules to a switch control unit for handling routing of the incoming telephone call, said switch control unit being on a signaling path of the incoming telephone call; wherein the server and intermediary routing control unit are external said signaling path.

20 Claims, 8 Drawing Sheets

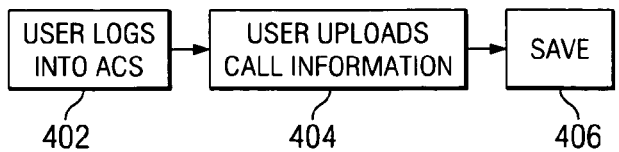
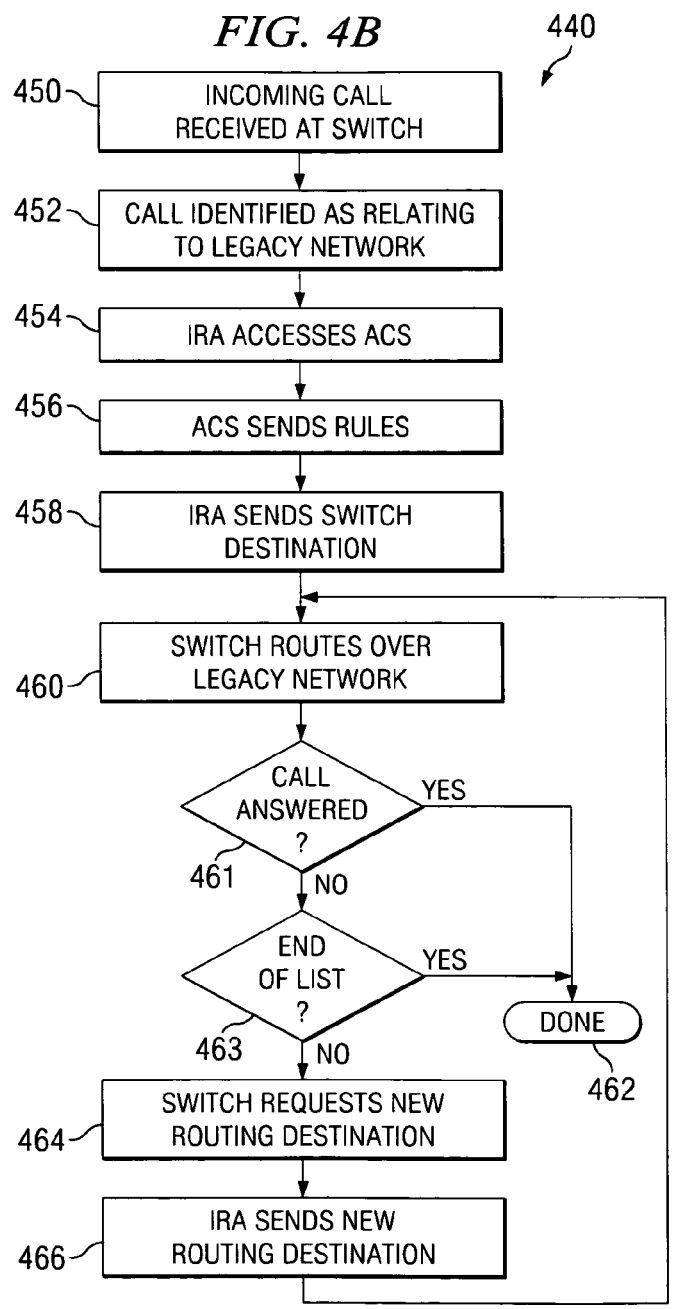

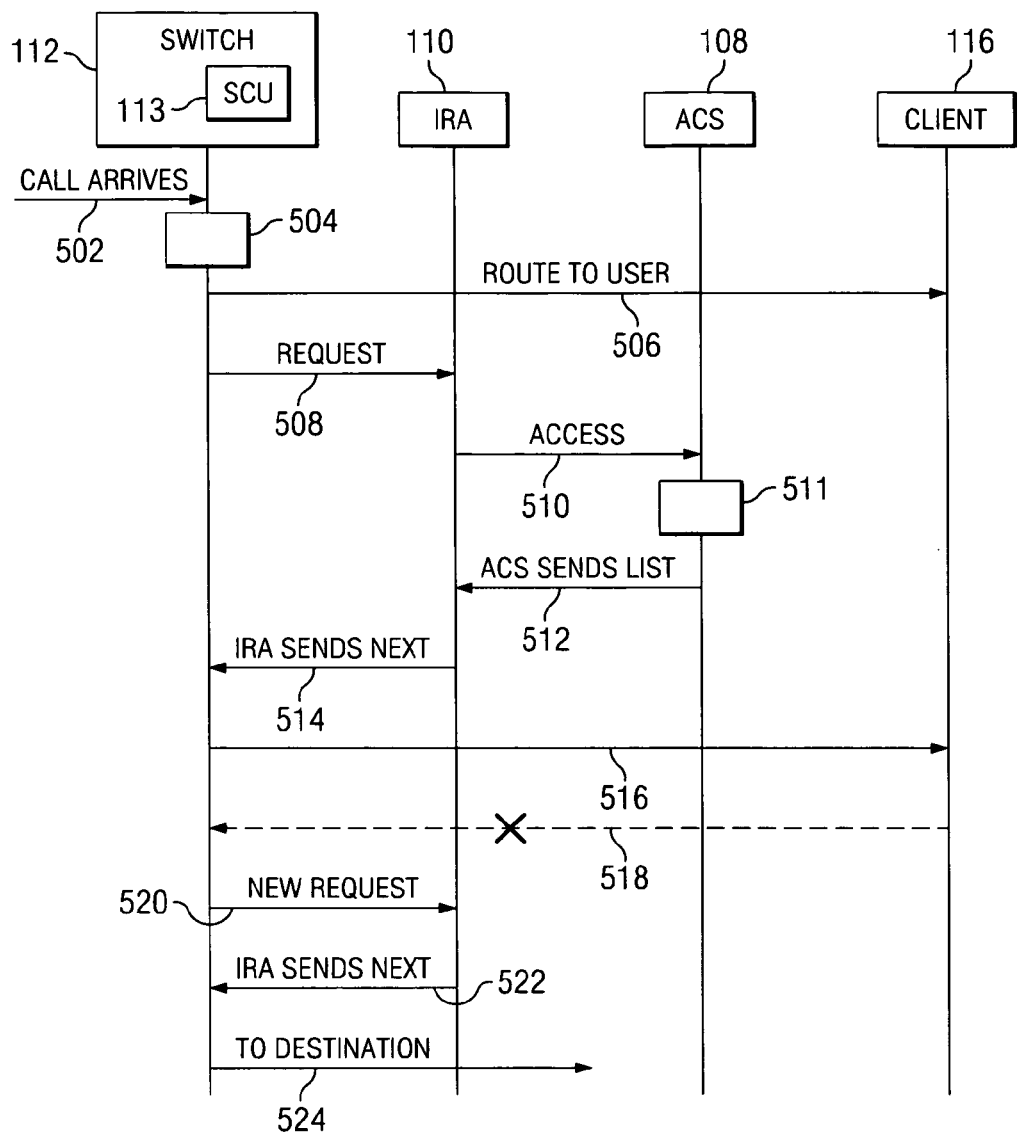
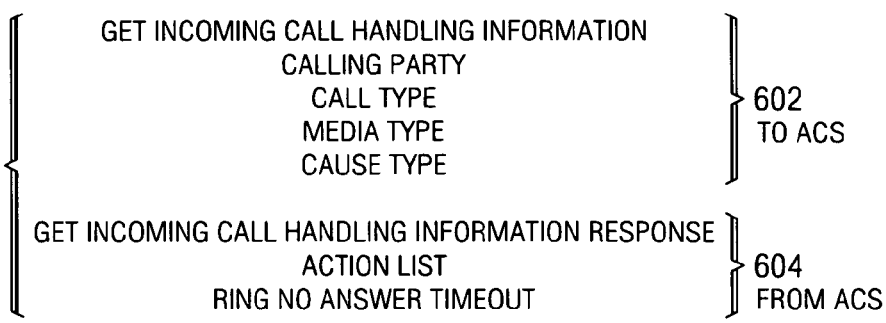

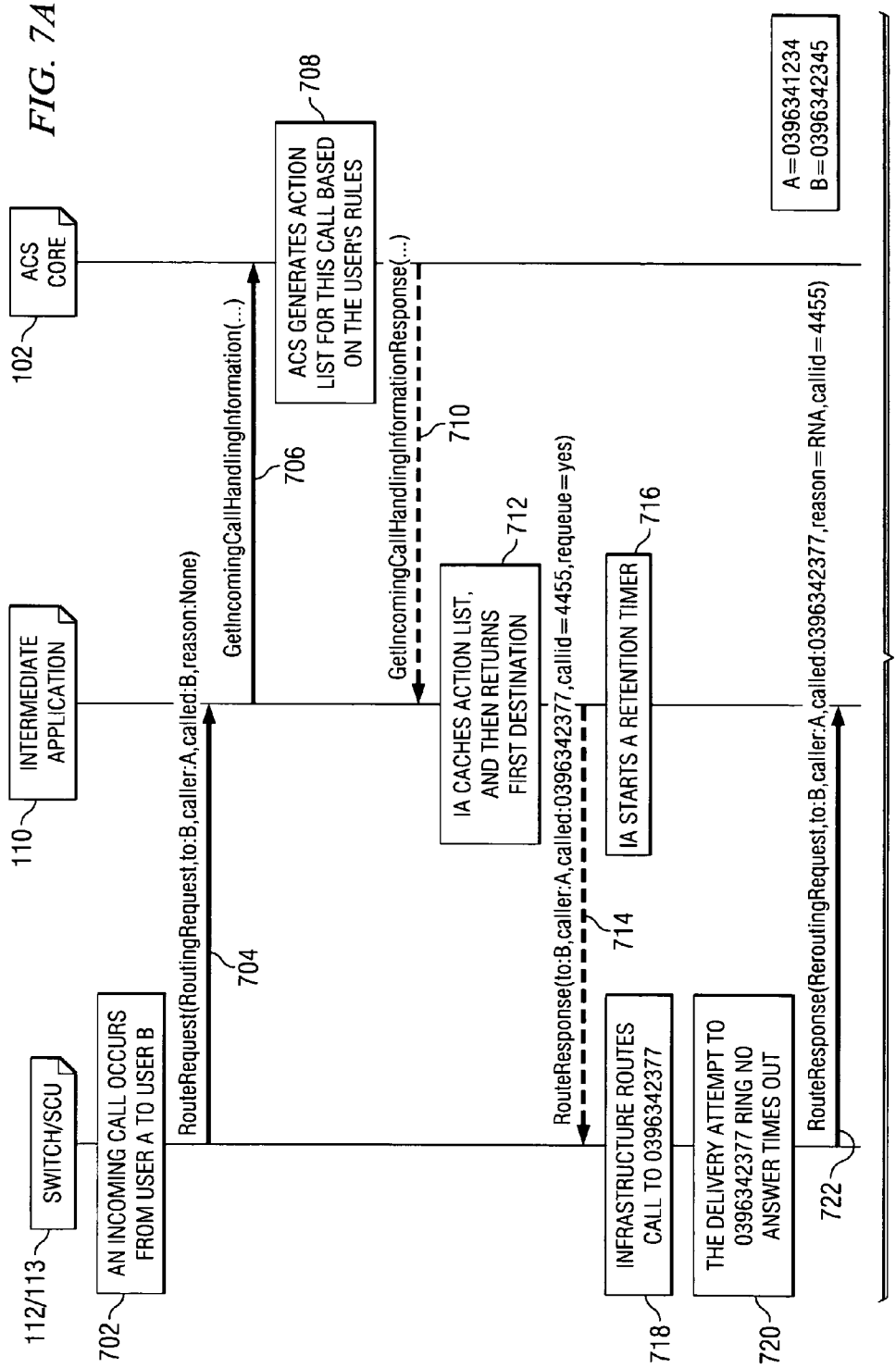

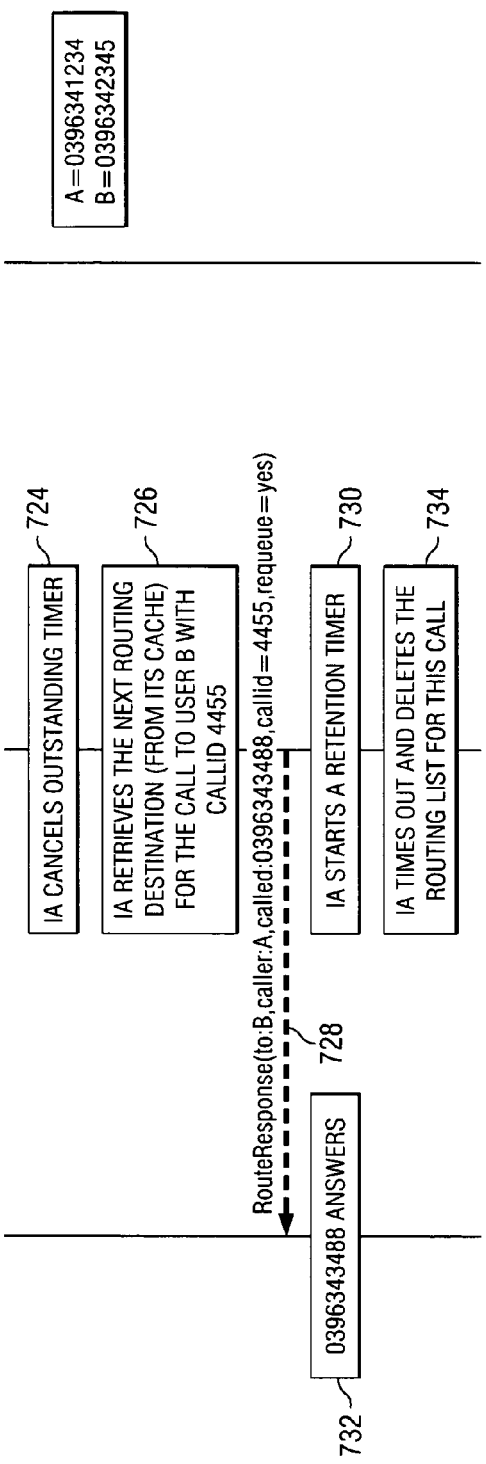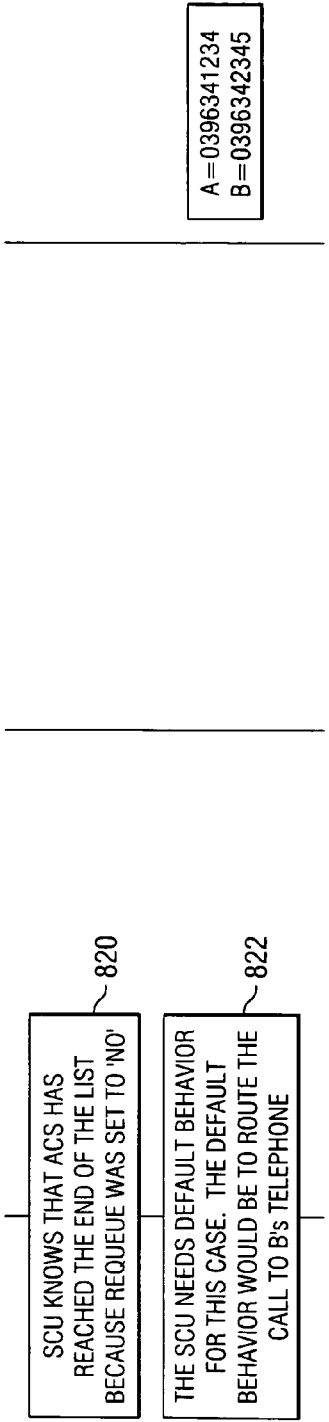

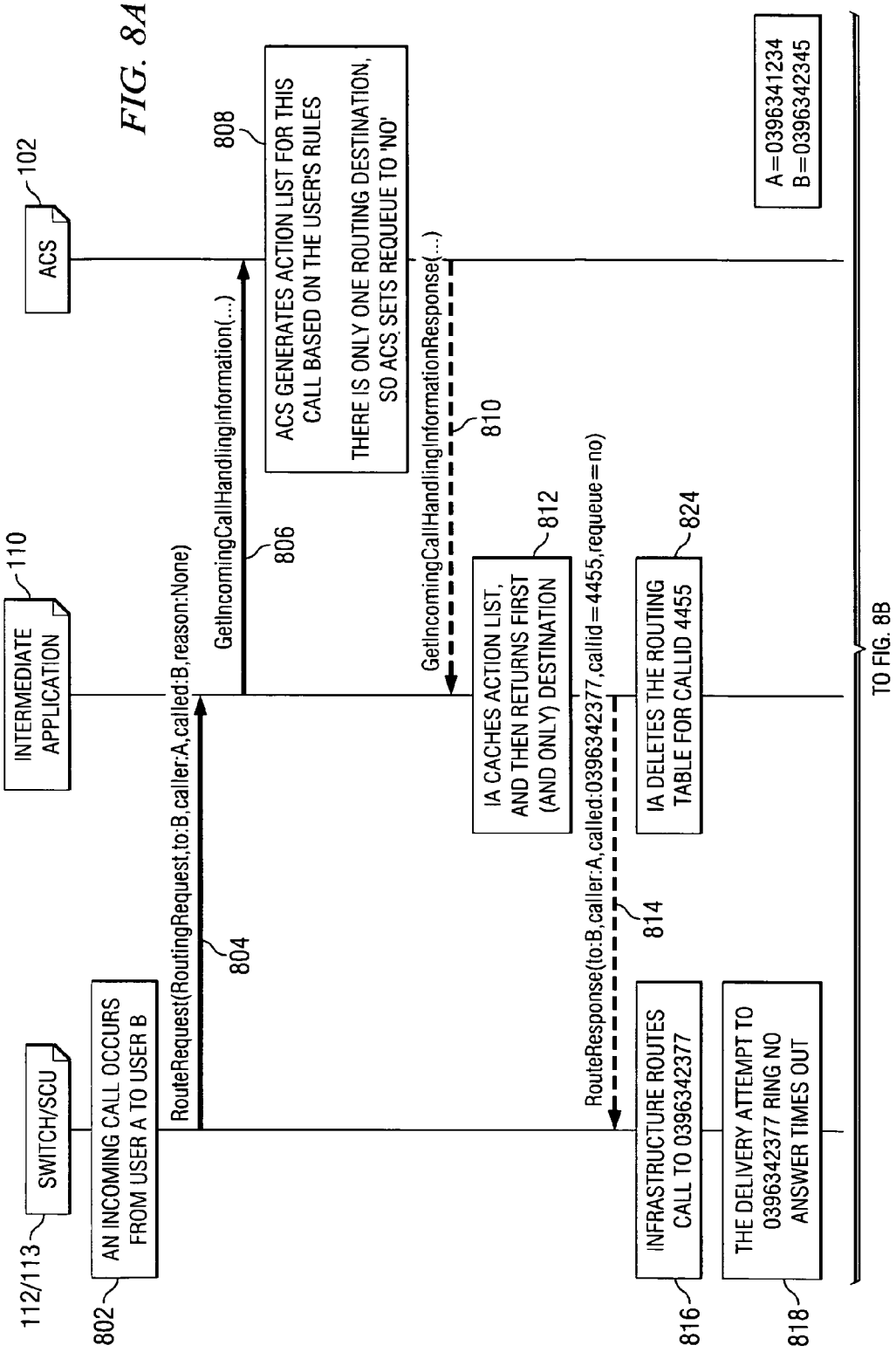

METHOD AND APPARATUS FOR PERSONAL CALL ROUTING REQUEST AND HANDLING

BACKGROUND OF THE INVENTION

1. Field of the Invention

The present invention relates to telecommunications systems and, in particular, to a system for routing and handling calls using personal rules.

2. Description of the Related Art

Some modern enterprise telecommunications systems can provide for monitoring and reporting the presence state of contacts on an enterprise user's contact list. Others allow users to specify handling of incoming telephone calls.

In such systems, the user can log in to a server and define rules, which are used to specify call handling procedures, such as whether the call is to be routed to a user's desk telephone, mobile telephone, voice mail, and the like. The server can further monitor user and device presence and availability states.

However, many enterprises that choose to make use of such an advanced telecommunications system already have in place legacy infrastructures and are reluctant to completely replace capital equipment. Consequently, adoption of new systems tends to occur relatively piecemeal, such that the new system and the legacy system both operate simultaneously.

As can be appreciated, the new advanced systems provide many features not available on the legacy system. It is nevertheless often desirable to provide as many features as possible to those users employing the legacy systems. However, in such advanced systems, typically all calls are routed through the server. Because all calls are routed through the server, network bandwidth can be adversely affected if a large number of legacy system related calls are received and routed through the server.

SUMMARY OF THE INVENTION

These and other drawbacks in the prior art are overcome in large part by a system and method according to embodiments of the present invention.

A system according to embodiments of the present invention includes a server including one or more databases for storing one or more handling rules specifying handling of incoming telephone calls; an intermediary routing control unit configured to access the one or more databases responsive to an incoming telephone call and provide the one or more handling rules to a switch control unit for handling routing of the incoming telephone call, said switch control unit being on a signaling path of the incoming telephone call; wherein the server and intermediary routing control unit are external said signaling path.

A system according to an embodiment of the present invention includes a first telecommunication infrastructure; a second telecommunication infrastructure; a server including one or more databases for storing one or more handling rules specifying handling of incoming telephone calls, the server configured to provide call processing in a signaling path in said first telecommunication infrastructure; and an intermediary routing control unit configured to access the one or more databases responsive to an incoming telephone call in the second telecommunication infrastructure and provide the one or more handling rules to a switch control unit for handling routing of the incoming telephone call, said switch control unit being on a signaling path of the incoming telephone call in the second telecommunication infrastructure; wherein the server and intermediary routing control unit are outside the signaling path of the incoming telephone call in the second telecommunication infrastructure.

In some embodiments, the one or more databases are user configurable via a browser-type interface. In some embodiments, the one or more databases maintain one or more routing lists for routing incoming telephone calls and said intermediary routing control unit is configured query said one or more databases at a beginning of an incoming telephone call on said second telecommunications infrastructure and to sequentially provide numbers on said one or more routing lists to said switch control unit responsive to an incoming telephone call and a failure to connect to a previous number on said list.

A telecommunications method according to embodiments of the present invention includes receiving an incoming call at a telecommunications switch associated with a first telecommunications system; querying a rules database at a server in a second telecommunications system, the rules database defining one or more rules for routing the incoming call over the first telecommunication system, the server being outside a signaling path of the incoming call; and routing the incoming call according to the one or more rules.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 4A and FIG. 4B are flowcharts illustrating operation of embodiments of the present invention.

FIG. 5 is a signaling diagram illustrating operation of embodiments of the present invention.

FIG. 6A, FIG. 6B, and FIG. 6C illustrate command signaling structure according to embodiments of the present invention.

FIG. 7 is a diagram illustrating operation of embodiments of the present invention.

FIG. 8 is a diagram illustrating operation of embodiments of the present invention.

DETAILED DESCRIPTION OF EMBODIMENTS OF THE INVENTION

Figure 1:
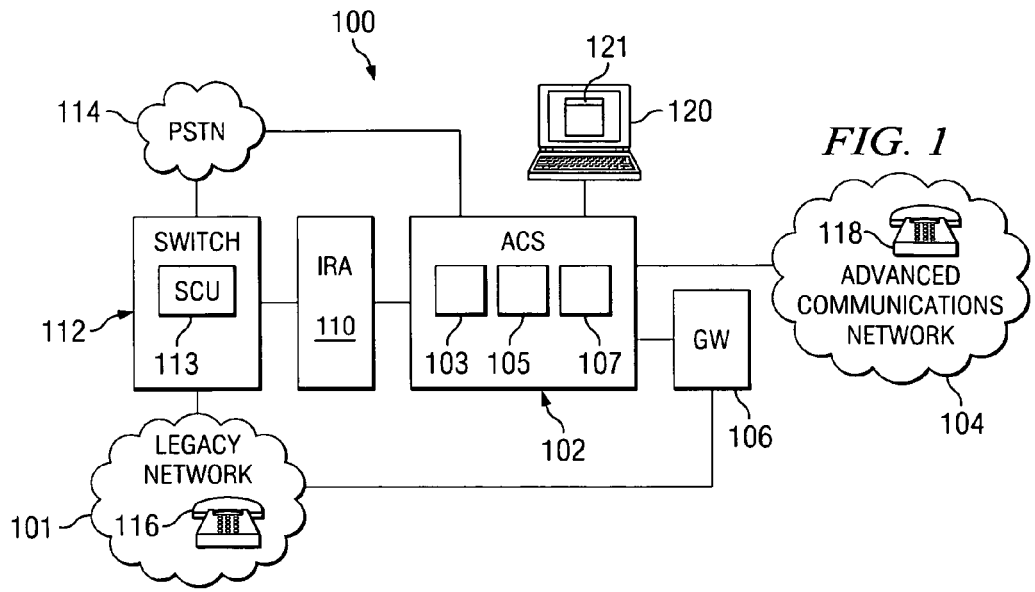
FIG. 1 is a diagram schematically illustrating a system according to embodiments of the present invention.

Turning now to the drawings and, with particular attention to FIG. 1, a diagram of a telecommunications system 100 according to an embodiment of the present invention is shown. The system 100 includes an intermediary routing application 110 that may include, be operably coupled to, or in communication with an advanced telecommunications server (ACS) 102. The ACS 102 may be coupled to, or in communication with, an advanced communication network infrastructure 104, for which it can provide routing, presence, and rules based communication, etc., services. The ACS 102 thus maintains one or more databases 103 of call and user information and a rules engine 105 for processing call and user information and routing rules. The ACS 102 can also include a presence and availability service 107. The advanced communication network 104 can include one or more user devices 118.

An exemplary advanced communication system including an ACS and an advanced communication network capable of being adapted for use in a system according to embodiments of the present invention is the OpenScape system, available from Siemens Communications, Inc. Such an environment can be implemented, for example, in conjunction with Windows Server, Microsoft Office Live Communications Server, Microsoft Active Directory, Microsoft Exchange and SQL Server.

The system 100 also includes a legacy network 101, i.e., a network infrastructure of different type than the advanced communication network 104. In particular, in some embodiments, the legacy network may be implemented as a legacy fixed line PBX infrastructure or legacy IP network. The legacy network 101 includes one or more user devices 116, which may be embodied as telephones, such as analog (DTMF) or digital telephones. A gateway 106 couples the legacy network 101 to the ACS 102. The legacy network 101 couples to a legacy telecommunications switch 112. The switch 112 may be embodied as any of a variety of switches, such as the Hicom 300, available from Siemens Communications, Inc., or those available from Nortel, Avaya, and Cisco for example. The telecommunications switch 112 itself is coupled to the public switched telephone network (PSTN) 114. The telecommunications switch 112 includes or is coupled to or in communication with a switch control unit 113 in accordance with embodiments of the present invention. It is noted that an ACS user can have calls routed to the legacy network or the PSTN, or any device for which a communication path can be established.

According to embodiments of the present invention, the intermediary routing application 110 acts as an intermediary between the ACS 102, the legacy network 101, and a secondary telecommunications switch 112. In particular, as will be explained in greater detail below, the intermediary routing application 110 allows a user device on legacy network 116 to make use of the facilities of the ACS 102, and yet have calls routed via the legacy network and not via the ACS 102 itself.

Figure 2:
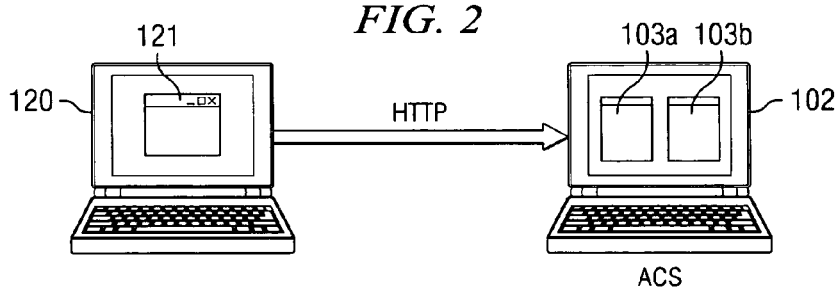
FIG. 2 is a diagram schematically illustrating operation of embodiments of the present invention.

As shown in FIG. 2, a user can log in to the ACS 102 using computer 120 with a web interface 121 and define call handling. In particular, the ACS 102 can maintain a rules engine 105 (FIG. 1) and one or more databases 103 for handling legacy network users 103a and advanced communication network users 103b. The computer 120 and ACS 102 may be implemented as computers employing suitable processors, such as a Pentium™ microprocessor such as the Pentium III™ or IV™ microprocessor, manufactured by Intel Corporation. Other suitable processors may be available from Motorola, Inc., AMD, or Sun Microsystems, Inc.

In operation, a user can log in and define rules and call handling lists. For example, if a user has a mobile telephone, a desk telephone, and a home telephone, he can log in and specify that the first number at which he should be reached is the office phone, then the desk phone, then home. Further, he can specify a ring no answer period (i.e., the period at which the system will move on to the next phone number). The rules and list information is then saved at the ACS 102.

When a call for a user 116 on legacy network 101 comes in at the switch 112, the switch control unit 113 will query the intermediary routing application 110 for how to handle the call. That is, the switch control unit 113 will provide various call information (e.g., calling party, called party, type, etc.) to the intermediary routing application 110. In response, the intermediary routing application 110 accesses the ACS 102, presenting information about the current call. The ACS 102 consults its rules engine 105, which generates an action list, which is returned to the intermediary routing application 110. The intermediary routing application 110 then passes the information from the rules list(s) to the switch 112 (or SCU 113) on where to route the call (e.g., to a user's desk phone, mobile phone, voice mail, etc.).

Figure 3:
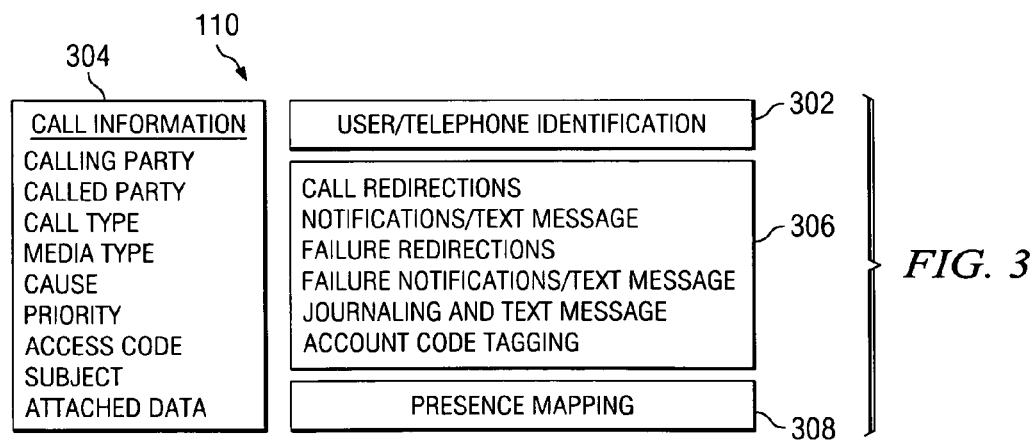
FIG. 3 is a diagram illustrating an exemplary intermediary routing control unit according to embodiments of the present invention.

Turning now to FIG. 3, a diagram illustrating an exemplary intermediary routing application 110 according to embodiments of the present invention is shown. The intermediary routing application 110 may be implemented as a suitably programmed computer or processor, such as a computer employing a Pentium series microprocessor.

The diagram illustrates various information maintained by the intermediary routing application 110 or provided to it by other devices. The intermediary routing application 110 maintains user information 302, incoming/outgoing call information 304, call handling information 306, and presence mapping information 308.

The user information 302 may include a list of users and their identification information. The call information 304 includes information about calls; in the case of incoming calls, the information is provided by the switch 112 or switch control unit 113. The information can include calling party, called party, call type (i.e., internal or secondary), media type, cause, priority, account code, subject, and attached data.

The call handling information 306 can include a list of call redirections; a list of notifications and text messages; a list of failure redirections; a list of failure notifications and text messages; journal logging actions and text messages; and account code tagging. It is noted that these actions are not exclusive and are exemplary only.

Presence mapping information 308 is used to map call information into presence information. As will be explained in greater detail below, for example, a call status of "incoming call" can be mapped to a presence status of "user busy." This information can be used, for example, as an input to the rules engine 105 and used for routing and handling the call.

Turning now to FIG. 4A, a flowchart 400 illustrating operation of an embodiment of the present invention is shown. The particular arrangement of elements in the flowchart 400 is not meant to imply a fixed order to the elements; embodiments can be practiced in any order that is practicable.

In particular, flowchart 400 illustrates call handling setup according to embodiments of the present invention. Initially, at a step 402, a user can log in to the ACS 102 using, for example, computer 120 and portal 121. It is noted that the user can be a user associated with the legacy network 101 or the ACS network 104. At a step 404, the user can enter his contact information into one or more of the ACS 102 databases. Finally, in a step 406, the user can save the entries. These are stored and available for use when incoming calls are received.

Turning now to FIG. 4B, a flowchart 440 illustrating operation of an embodiment of the present invention is shown. The particular arrangement of elements in the flowchart 440 is not meant to imply a fixed order to the elements; embodiments can be practiced in any order that is practicable.

In a step 450, an incoming call may be received at the switch 112. In a step 452, the switch 112 (or the switch control unit 113) may identify the call as relating to a legacy network user of ACS services and requests routing instructions from the intermediary routing application 110. In a step 454, the intermediary routing application 110 can access the ACS 102. In a step 456, the ACS 102 sends an action list to the intermediary routing application 110. In a step 458, the intermediary routing application 110 reads the list for a next destination and sends the switch 112 (or SCU 113) the destination to which the call is to be routed. It is noted that, in other embodiments, the entire list could be provided to the legacy switch 112 (or SCU 113). Finally, in a step 460, the switch 112 routes the call to the destination identified over the legacy network 101.

In a step 461, if the call is answered, then processing can end (step 462); in certain embodiments, the action list can be cleared. If the call is not answered, then in step 463, the intermediary application 104 determines if the end of the list has been reached. If so, then again, at step 462, processing is complete. Otherwise, the switch 112 or switch control unit 113, can request a new number, in a step 464. In a step 466, the intermediary application 110 accesses the list again and determines the next destination on the list, and then sends the number to the switch 112. The switch can then route the call to that number.

Turning now to FIG. 5, a diagram illustrating signaling flow for an embodiment of the present invention is shown. In particular, FIG. 5 illustrates signaling for an incoming call. Shown are switch 112, switch control unit 113, intermediary routing application 110, server 102, and legacy network client 116.

A call arrives at the switch 112 at 502. At 504, the switch 112 and, particularly, a switch control unit 113 associated with the switch, determines whether the call is associated with a legacy network user of ACS services or a legacy network user who does not make use of ACS services. If a user does not make use of ACS services, then at 506, the call is routed to the legacy network user. If the called party is identified as a user who makes use of ACS services, then at 508, the switch 112 and, particularly, the switch control unit 113, will send a request to the intermediary routing application 110 for routing information. At 511, the intermediary routing application 110 will access the ACS 102. At 515, the ACS 102 will access its rules engine and/or database lists and provide the appropriate action list to the intermediary routing application 110 at 512. The intermediary routing application 110 reads the routing list and provides the next in line to the switch 112, at 514. At 516, the switch 112 will route the call to the destination specified by the intermediary routing application 110.

If, at 518, the client 116 does not pick up, then the switch 112 or SCU 113 will contact the intermediary routing application 110, at 520, for a next destination. At 522, the intermediary routing application 110 will determine from the list the next routing destination and send it to the switch 112. At 524, the switch 112 will route the call the appropriate destination.

Turning now to FIG. 6A, a diagram illustrating signaling exchanged between the ACS 102 and the intermediary routing application 110 according to a particular embodiment of the present invention is shown. In particular, a request for call handling information from the intermediary application 110 to the ACS 102 is shown at 602. The GetIncomingCallHandlingInformation request 602 includes information parameters on calling party, call type, media type, and cause type. In some embodiments, it can also include a called party.

The calling party shows the source of the incoming call and is needed only if there is a rule that determines actions based on the identity of the calling party. It can take on a value of "unknown" or a SIP URI. The call type identifies whether the call is internal or external. The media type identifies the type of media. For example, in some embodiments, the media type could be voice, IM, e-mail, pager, SMS, portal, or unknown. A cause type can provide a further description of the nature of the call, such as Forward, Active Participation, etc.

The response to the request is shown at 604. The GetIncomingCallHandlingInformationResponse 604 can include a ring no answer time out and an action list parameter. The ring no answer timeout is the time in seconds that an individual target should be rung before the delivery attempt is considered to fail. The ring no answer timeout is typically set by the user.

Figure 6B:
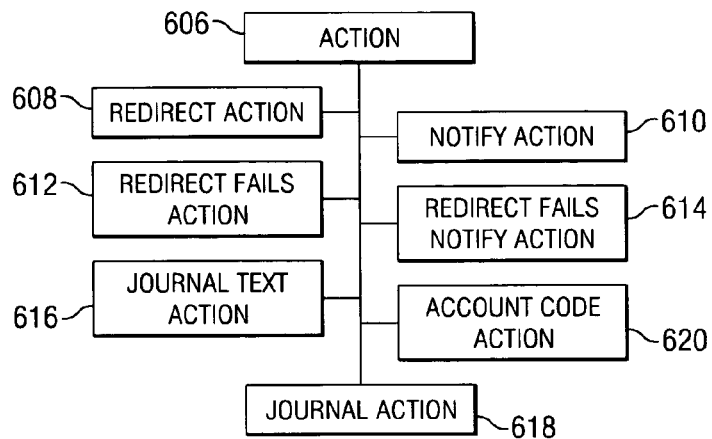

The action list is a list of actions that should be taken. In some embodiments, as shown in FIG. 6B, these include action objects 606 RedirectAction 608, NotifyAction 610, RedirectFailsRedirectAction 612, RedirectFailsNotifyAction 614, JournalTextAction 616, JournalAction 618, and AccountCodeAction 620. That is, the response can include redirect commands, notify commands, and actions to take if a redirect of the call fails. In addition, the system journal can be acted on. It is noted that other actions may be provided.

Figure 6C:
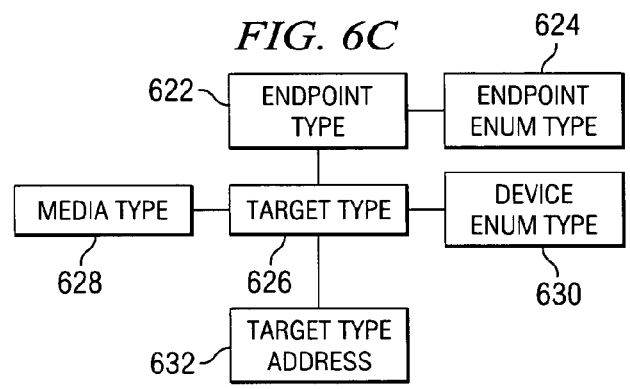

Objects RedirectAction 608, NotifyAction 610, RedirectFailsRedirectAction 612, RedirectFailsNotifyAction 614 each includes an object EndpointType as shown in FIG. 6C. EndPointType are targets for the action returned by the ACS 102 to the intermediary routing application 112. In addition, NotifyAction 610 and RedirectFailsNotifyAction 614 can include notification messages.

JournalAction 618 defines whether there is to be a system defined journal entry written to the journal. JournalTextAction 616 is a user-defined entry that is to be written to the journal. AccountCodeAction 620 is an account code to assign to the call activity.

The EndPointType 622 defines the target of the actions returned by the ACS 102. The EndpointType 622 has objects of additional types, as shown in FIG. 6C. These include EndPointEnumType 624 and TargetType 626.

The EndpointEnumType 624 defines the type of the endpoint destination returned. For example, these can take on values of Buddy, Contact, Device, etc. In addition, EndPointType 632 includes a TargetType 626, which includes a MediaType 628, TargetTypeAddress 632 and DeviceEnumType 630. The TargetType 626 thus identifies the media type of a device, the device name, and its address. It also provides an array of resolvedTargets. The DeviceEnumType 630 defines the general type of device that is represented by the endpoint. It can be a device associated with the ACS infrastructure ("Registered"), a device created programmatically by a third party application ("SDK"), a device such as a home phone created by the end user ("Associated"), a list of devices ("ContextDeviceList"), a system target like Voicemail ("System"), etc.

The TargetTypeAddress 632 defines how the device should be uniquely matched. The device itself is identified by the string in the object. This string is then matched using filter values of equals/startswith/contains/etc. against the device/number information passed into the rules engine. For instance a rule could be written that says that if the caller number contains "408" then send the call to voicemail.

As noted above, the switch 112 can provide notification of user events to the ACS 102 as well as request a next routing destination. According to certain embodiments, the switch employs the Simple Object Access Protocol (SOAP Version 1.1) to communicate with the intermediary device. A SOAP message adheres to the SOAP 1.1 XML schema, which requires that elements and attributes to be fully qualified (use prefixes or default namespaces). Every XML document has a root element, and in SOAP it is the Envelope element. Envelope may contain an optional Header element, and must contain a Body element. If a Header element is used, it must be the immediate child of the Envelope element, and precede the Body element. The Header element can contain XML elements that describe security credentials, transaction IDs, routing instructions, debugging information, payment tokens, or any other information about the message that is important in processing the data in the Body element. The Body element contains the actual application data being exchanged between applications in XML format. The Body element delimits the application-specific data.

An exemplary routing request appears below:

```
<?xml version="1.0" encoding="UTF-8"?>
<Envelope xmlns="http://www.w3.org/2003/05/soap-envelope"
    xmlns:xsi="http://www.w3.org/2001/XMLSchema-instance"
    xsi:schemaLocation="http://www.w3.org/2003/05/soap-envelope
    soap-envelope.xml">
    <Header/>
    <Body>
        <!-- Payload -->
        <RouteRequest>
            <CallingPartyDisplay val="0396341234"/>
            <CallingParty FNN="0396341234"/>
            <CalledParty FNN="0396342345"/>
            <SessionID val=""/>
            <CallingBGID val="2865"/>
            <CalledBGID val="2865"/>
            <Redirect reason="None"/>
            <Event type="RoutingRequest"/>
            <Timestamp val="2001-12-17T09:30:47.0Z"/>
        </RouteRequest>
    </Body>
</Envelope>
```

The routing destination request includes the following parameters: Calling party, Called Party, and RedirectReason. Additional fields, such as CallingBGID and CalledBGID ("business group identifier"), and sessionID to identify a particular call instance, may also be provided.

An exemplary routing destination response appears below:

```
<?xml version="1.0" encoding="UTF-8"?>
<Envelope xmlns="http://www.w3.org/2003/05/soap-envelope"
    xmlns:xsi="http://www.w3.org/2001/XMLSchema-instance"
    xsi:schemaLocation="http://www.w3.org/2003/05/soap-envelope
    soap-envelope.xml">
    <Header/>
    <Body>
        <!-- Payload -->
        <RouteRequestResponse>
            <CallingParty FNN="0396341234"/>
            <CalledParty FNN="0396343488"/>
            <SessionID val="4455"/>
            <Requeue val="false"/>
            <RNAtimer val="15"/>
            <Timestamp val="2004-07-22T17:00:19Z"/>
        </RouteRequestResponse>
    </Body>
</Envelope>
```

Turning now to FIG. 7, a signaling diagram illustrating a routing request sequence according to embodiments of the present invention is shown. Shown are a switch 112, including a switch control unit 113, an intermediary routing application 110, and ACS 102.

At 702, a call from a user A to a user B on the legacy network 101 arrives at the switch 112. At 704, the switch 112's switch control unit 113 sends a route request RouteRequest to the intermediary routing application 110. At 706, the intermediary routing application 110 sends an GetIncomingCallHandlingInformation request to the ACS 102. At 708, ACS 102 generates the action list for the call based on the user's rules. At 710, the ACS 102 transmits this information to the intermediary application 110 as a GetIncomingCallHandlingInformationResponse. At 712, the intermediary routing application 110 caches the action list and returns the first destination on the list. At 714, the destination is sent to the switch control unit 113 as a RouteResponse. At 716, the intermediary routing application 110 begins a timer, and at 718, the legacy network infrastructure attempts to deliver the call. At 720, the delivery attempt fails when the ring no answer timer times out. A new RouteRequest is sent at 722 and the timer is canceled at 724. The next routing destination from the cached action list is accessed at 726 and sent in a RouteResponse at 728. At 730 the ACS 102 starts the timer again. At 732, the called party answers. At 734, the intermediary routing application 110 deletes the routing table for the call.

Turning now to FIG. 8, a diagram illustrating routing requests for an incoming call when the end of the destination list is reached. The end of the destination list could be reached, for example, when multiple numbers are returned or only a single number is returned in the action list. In the example illustrated, a single number is returned. Shown are a switch 112, including switch control unit 113, and an intermediary routing application 110.

At 802, an incoming call comes in to switch 112 from a user A to user B. At 804, the switch control unit 113 sends a RouteRequest to the intermediary routing application 110. At 806, the intermediary routing application 110 sends a Get-IncomingCallHandlingInformation request to the ACS 102. At 808, the ACS 102 generates the action list for this call based on the user input rules, and identifies that there is only one item on the list (requeue set to "no"). At 810, the intermediary application 110 receives the routing table as a GetIncomingCallHandlingInformationResponse from the ACS 102. At 812, the intermediary routing application 110 caches the list and sends the only entry on the table to the switch 112 at 814 as a RouteResponse. At 816, the network routes the call to the number from the table. At 818, ring no answer time expires and the attempt is considered to have failed. At 820, the switch control unit 113 identifies that the end of the list has been reached and at 822 performs a predetermined default action.

As noted above, in some embodiments, the advanced communication server 102 includes presence and availability functions. A presence and availability service 107 (FIG. 1) at the ACS 102 can maintain ongoing data regarding the presence states of system users and devices. The presence states can be used by the rules engine 105 to route calls. For example, a rule might be to not route a call to a device that is already busy in a call. Exemplary presence states can include states of "available," "idle," "non-available," "busy," "away," "unknown," "partially available" (e.g., a device may be "busy" on a voice channel but available on an instant messaging channel), "be right back," "present," "not present," etc.

According to embodiments of the present invention, the intermediary routing application 110 receives switch call states as they appear to the switch 112. For example, turning now to FIG. 9, a diagram 900 representative of exemplary call states maintained by the switch 112 is shown. The state diagram 900 includes states ringing 902, idle 904, active 906, and rerouting 908. During an incoming call, the intermediary routing application 110 then converts these to states readable by the ACS 102, for example, using presence mapping 308 (FIG. 3). For example, in one embodiment, the states of Ringing, Active, and Rerouting can be mapped as "Active," while the state of Idle can be mapped as Idle.

An exemplary SOAP envelope with payload for Presence Notifications appears below:

```
<?xml version="1.0" encoding="UTF-8"?>
    <soap:Envelope xmlns:soap="http://schemas.xmlsoap.org/soap/envelope/"
        xmlns:xsi="http://www.w3.org/2001/XMLSchema-instance"
        xsi:schemaLocation="http://schemas.xmlsoap.org/soap/envelope/envelopev1-1.xml">
            <soap:Header/>
            <soap:Body>
                <!-- Payload -->
                <CallState>
                    <ToParty FNN="0396341234"/>
                    <CallingPartyDisplay val="0396341234"/>
                    <CallingParty FNN="0396341234"/>
                    <CalledParty FNN="0396342345"/>
                    <CallingBGID val="2865"/>
                    <CalledBGID val="2865"/>
                    <Event type="Ringing"/>
                    <SequenceN val="0"/>
                    <Timestamp val="2004-07-22T17:00:19Z"/>
                </CallState>
            </soap:Body>
</soap:Envelope>
```

Figure 9:
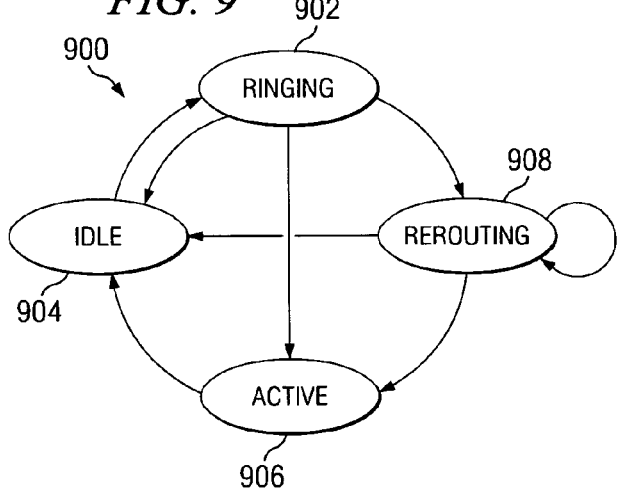
FIG. 9 is a diagram illustrating exemplary call states according to embodiments of the present invention.

As can be seen, the CallState parameter includes Calling Party, Called Party, and a Call Event. The Call Event takes on values of Ringing, Rerouting, Active, and Idle responsive to the call states (FIG. 9).

Figure 10:
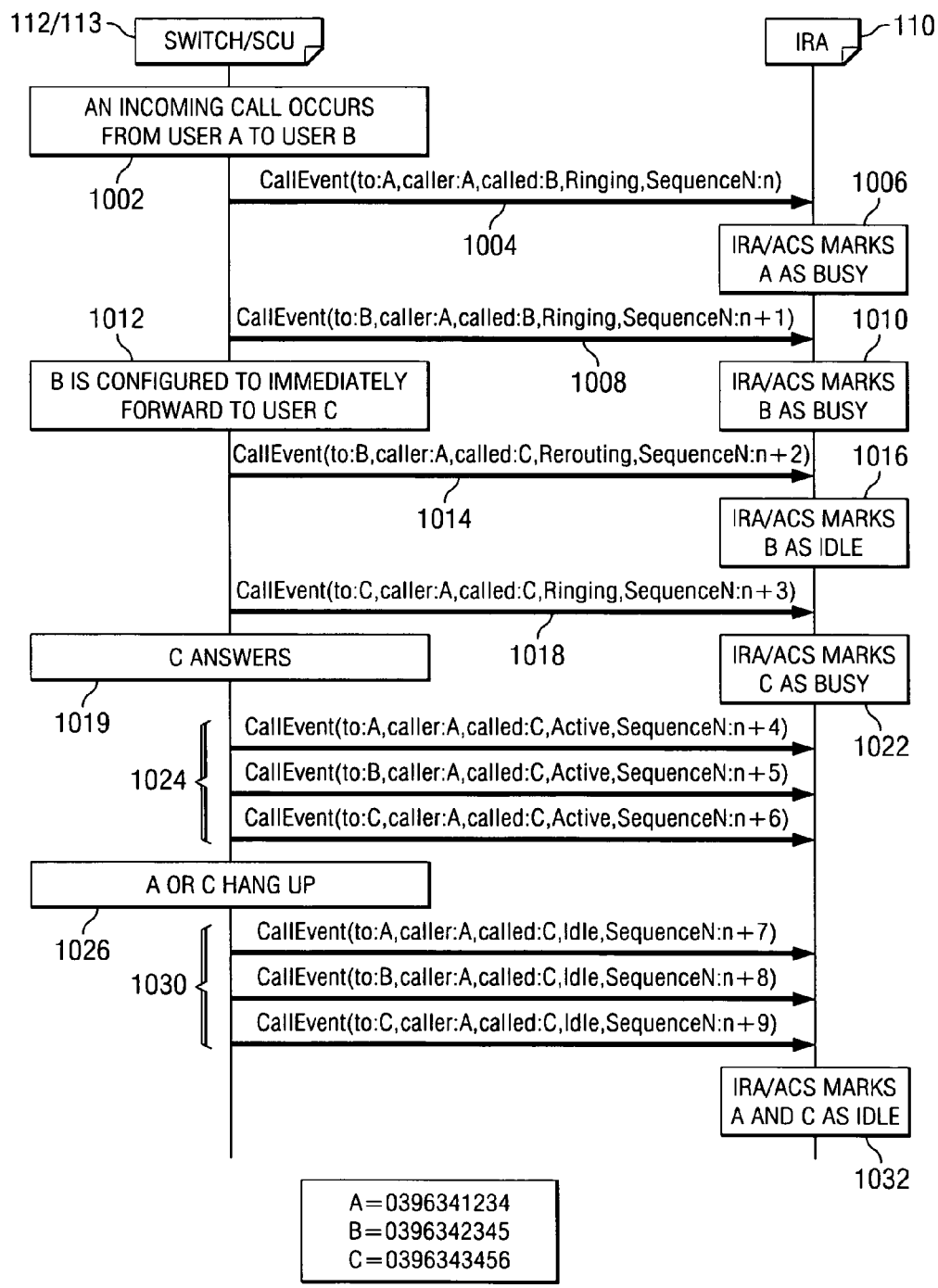
FIG. 10 is a diagram illustrating operation of embodiments of the present invention.

Turning now to FIG. 10, a diagram illustrating exemplary mapping in the case of a forwarded call is shown. Shown are a switch 112 and intermediary routing application 110.

In the example illustrated, a caller A and a caller B both make use of ACS services. A call is received at the switch from user A to user B, at 1002. When ringing starts, the switch 112 sends messages 1004, 1008 to the intermediary routing application. The intermediary routing application 104 communicates with the ACS 112 to mark user A and user B as "busy," at 1006, 1010. It is noted that, in the embodiment illustrated, CallEvent messages are generated for each user of ACS services; if the call was not among ACS users, no call event would be generated for the non-ACS user.

In the example illustrated, user B has configured his phone to forward to user C after a predetermined number of rings, for example, at 1012. The switch 112 does so, which is reported at 1014 as "Rerouting," for user B, and "Ringing," for user C, at 1018. User C answers at 1019. The intermediary routing application 110 communicates with the ACS 102 and defines B as idle at 1016 and C as busy, at 1022. As the call is connected, the users are reported as Active, at 1024. Then, at 1026, user A or user C can hang up. The users are then reported as Idle by the switch 112; the intermediary routing application 110 communicates the users as being idle, at 1030. They are marked as such at 1032. It is noted that the mapping of states is adaptable to the legacy switch; thus the figure is exemplary only.

The methods described herein may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, in some embodiments, many, if not all, of the elements for the methods described above are optional or can be combined or performed in one or more alternative orders or sequences and the claims should not be construed as being limited to any particular order or sequence, unless specifically indicated.

Each of the methods described above can be performed on a single computer, computer system, microprocessor, etc. In addition, in some embodiments, two or more of the elements in each of the methods described above could be performed on two or more different computers, computer systems, microprocessors, etc., some or all of which may be locally or remotely configured. The methods can be implemented in any sort or implementation of computer software, program, sets of instructions, programming means, code, ASIC, or specially designed chips, logic gates, or other hardware structured to directly effect or implement such software, programs, sets of instructions, programming means or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings and description were chosen in order to explain the principles of the invention and its practical application. The drawings are not necessarily to scale and illustrate the device in schematic block format. It is intended that the scope of the invention be defined by the claims appended hereto, and their equivalents

What is claimed is:

1. A system, comprising:
    a server including a presence and availability control unit and one or more databases for storing one or more handling rules specifying handling of incoming telephone calls for a first telecommunications system; and
    an intermediary routing control unit configured to access the one or more databases responsive to an incoming telephone call from a second telecommunications system coupled to a switch control, unit and provide the one or more handling rules to the switch control unit for handling routing of the incoming telephone call to enable the incoming call to use facilities of the server by having the ability for the incoming call to be routed by the second telecommunications system, said switch control unit being on a signaling path of the incoming telephone call, wherein said intermediary routing control unit is further configured to receive call state information from the switch control unit and map said call state information into presence state information for the presence and availability control unit;

wherein the first and second telecommunications systems are separated from each other by the server and the switch control unit, wherein the server and the intermediary routing control unit are external to the signaling path.

2. A system in accordance with claim 1 wherein the one or more databases are user configurable via a browser-type interface.

3. A system in accordance with claim 1, wherein the one or more databases maintain one or more routing lists for routing incoming telephone calls and said intermediary routing control unit is configured to query said one or more databases at a beginning of an incoming telephone call and to sequentially provide numbers on said one or more routing lists to said switch control unit responsive to an incoming telephone call and a failure to connect to a previous number on said list.

4. A system in accordance with claim 1, wherein the intermediary routing control unit provides a handling rule based on said presence state information.

5. A system comprising:
a first telecommunication infrastructure;
a second telecommunication infrastructure;
a server including a presence and availability control unit and one or more databases for storing one or more handling rules specifying handling of incoming telephone calls, the server configured to provide call processing in a signaling path in said first telecommunication infrastructure; and
an intermediary routing control unit configured to access the one or more databases responsive to an incoming telephone call in the second telecommunication infrastructure and provide the one or more handling rules to a switch control unit for handling routing of the incoming telephone call to enable the incoming call to use facilities of the server by having the ability for the incoming call to be routed by the second telecommunication infrastructure instead of the first telecommunication infrastructure, said switch control unit being on a signaling path of the incoming telephone call in the second telecommunication infrastructure,
wherein said intermediary routing control unit is further configured to receive call state information from the switch control unit and map said call state information into presence state-information for the presence and availability control unit,
wherein the first and second telecommunication infrastructures are separated from'each other by the server and the switch control unit
wherein the server and intermediary routing control unit are outside the signaling path of the incoming telephone call in the second telecommunication infrastructure.

6. A system in accordance with claim 5, wherein the one or more databases are user configurable via a browser-type interface.

7. A system in accordance with claim 5, wherein the one or more databases maintain one or more routing lists for routing incoming telephone calls and said intermediary routing control unit is configured to query said one or more databases at a beginning of an incoming telephone call on said second telecommunication infrastructure and to sequentially provide numbers on said one or more routing lists to said switch control unit responsive to an incoming telephone call and a failure to connect to a previous number on said list.

8. A system in accordance with claim 5, Wherein the intermediary routing control unit provides a handling'rule based on said presence state information.

9. A system in accordance 6, wherein said first telecommunication infrastructure is a voice over IP infrastructure and said second telecommunication, infrastructure is a circuit switched infrastructure.

10. A telecommunications method, comprising:
receiving an incoming call at a telecommunications switch associated with a first telecommunications system;
querying, by an intermediary control unit, a rules database at a server in a second telecommunications system, the rules database defining one or more rules for routing the incoming call over the first telecommunications system, the server and the intermediary control unit being outside a signaling path of the incoming call, wherein the first and second telecommunications systems are separated from each other by the server and the telecommunications switch;
mapping a call status to a presence status; and
routing the incoming call according to the one or more rules, wherein the routing can be via the second telecommunications system instead of via the server of the first telecommunications system.

11. A telecommunications method in accordance with claim 10, further including accessing the server to define the rules via a browser interface.

12. A telecommunications method in accordance with claim 10, wherein said querying a rules database comprises accessing a list of numbers to attempt to call.

13. A telecommunications method in accordance with claim 12, further including sequentially providing single numbers in said list to said telecommunications switch.

14. A telecommunications method in accordance with claim 10, further comprising providing a handling rule based on said presence status.

15. A telecommunications system, comprising:
a primary communications system including a server for defining handling of calls via the primary communications system; and
an interface operably coupled to the server for defining handling of calls via a secondary communications system which is coupled to a switch control unit, the primary and secondary communications systems are separated from each other by the server and the switch control unit, said switch control unit being on a signaling path of the calls from the secondary communications system,
wherein the server and the interface are external to the signaling path,
wherein the interface enables calls from the secondary communications system to access facilities of the server by having the ability for the calls from the secondary communications system to be routed by the secondary telecommunications instead of the primary communications system,
wherein the interface is configured to map call status of calls on the secondary communications system to presence information in the primary communications system.

16. A telecommunications system in accordance with claim 15, wherein the primary communications system comprises a voice over IP system and said secondary communications system comprises a circuit switched system.

17. A: telecommunications system in accordance with claim 15, said interface provides a handling rule based on said presence information.

18. A telecommunications system in accordance with claim 15, wherein the secondary communications system includes a switch operably coupled to the interface, the switch adapted to query the interface for instructions on handling calls.

19. A telecommunication's method comprising:
   receiving an incoming call at a telecommunications switch associated with a first telecommunications system, said telecommunications switch being on a signaling path of the incoming call:
   querying a rules database at a server of a second telecommunications system by an intermediary control unit, the rules database defining one or more rules for routing the incoming call over the first telecommunications system, the server and the intermediary control unit being outside the signaling path of the incoming call, wherein the first and second telecommunications systems are separated from each other by the server and the telecommunications switch;
   mapping a call status to a presence status and providing the one or more rules based on the presence status; and
   routing the incoming call according to the one or more rules, wherein the routing can be via the second telecommunications system instead of via the server of the first telecommunications system.

20. The method in accordance with claim 19, wherein querying the rules database comprises accessing a list of numbers to attempt to call.

* * * * *